(12) United States Patent
Jeong

(10) Patent No.: US 10,703,868 B2
(45) Date of Patent: Jul. 7, 2020

(54) COMPOSITION FOR FLOORING CONTAINING COCONUT FIBERS AND METHOD FOR MANUFACTURING FLOORING USING SAME

(71) Applicant: Dae Ho Jeong, Daegu (KR)

(72) Inventor: Dae Ho Jeong, Daegu (KR)

( * ) Notice: Subject to any disclaimer, the term of this patent is extended or adjusted under 35 U.S.C. 154(b) by 3 days.

(21) Appl. No.: 16/313,827

(22) PCT Filed: Jul. 13, 2017

(86) PCT No.: PCT/KR2017/007532
§ 371 (c)(1),
(2) Date: Dec. 27, 2018

(87) PCT Pub. No.: WO2018/012906
PCT Pub. Date: Jan. 18, 2018

(65) Prior Publication Data
US 2019/0153173 A1    May 23, 2019

(30) Foreign Application Priority Data
Jul. 13, 2016   (KR) .................. 10-2016-0088731

(51) Int. Cl.
| | |
|---|---|
| C08J 5/04 | (2006.01) |
| C08K 3/22 | (2006.01) |
| C08K 3/26 | (2006.01) |
| C08K 3/06 | (2006.01) |
| C08K 5/07 | (2006.01) |
| B29C 70/34 | (2006.01) |
| C08K 5/56 | (2006.01) |
| C08L 9/04 | (2006.01) |
| C04B 26/04 | (2006.01) |
| B29L 31/00 | (2006.01) |
| C04B 111/60 | (2006.01) |

(52) U.S. Cl.
CPC .............. *C08J 5/045* (2013.01); *B29C 70/34* (2013.01); *C04B 26/04* (2013.01); *C08K 3/06* (2013.01); *C08K 3/22* (2013.01); *C08K 3/26* (2013.01); *C08K 5/07* (2013.01); *C08K 5/56* (2013.01); *C08L 9/04* (2013.01); *B29L 2031/732* (2013.01); *C04B 2111/60* (2013.01); *C08J 2309/04* (2013.01); *C08K 2003/2296* (2013.01); *C08K 2003/265* (2013.01)

(58) Field of Classification Search
CPC .. C08J 5/045; C08J 2309/04; B29L 2031/732; C04B 2111/60
See application file for complete search history.

(56) References Cited

U.S. PATENT DOCUMENTS

| | | | |
|---|---|---|---|
| 6,410,653 B1 * | 6/2002 | Fujii ....................... | C08C 19/28 525/285 |
| 2005/0080150 A1 * | 4/2005 | Nakahama ................ | C08F 8/34 521/50 |
| 2007/0261344 A1 * | 11/2007 | Proulx .................... | B29C 43/30 52/403.1 |
| 2016/0376421 A1 * | 12/2016 | Obrecht ................... | C08K 5/13 524/347 |
| 2016/0376422 A1 * | 12/2016 | Obrecht ................... | C08K 5/13 524/347 |
| 2017/0327669 A1 * | 11/2017 | Ng ......................... | C08F 236/12 |

FOREIGN PATENT DOCUMENTS

| | | | | |
|---|---|---|---|---|
| KR | 10-2005-0035094 A | 4/2005 | | |
| KR | 10-2009-0098479 A | 9/2009 | | |
| KR | 10-0945949 B1 | 3/2010 | | |
| KR | 10-2010-0122183 A | 11/2010 | | |
| KR | 10-2012-0027763 A | 3/2012 | | |
| KR | 10-2013-0030090 A | 3/2013 | | |
| KR | 10-2013-0128222 A | 11/2013 | | |
| KR | 10-2015-0015786 A | 2/2015 | | |
| KR | 10-2016-0091295 A | 8/2016 | | |
| WO | WO-2015101599 A1 * | 7/2015 | ............... | C08K 5/13 |
| WO | WO-2015101600 A1 * | 7/2015 | ............... | C08K 5/13 |
| WO | WO-2016093689 A1 * | 6/2016 | ............ | C08F 236/12 |

* cited by examiner

*Primary Examiner* — Nicholas E Hill
(74) *Attorney, Agent, or Firm* — Maschoff Brennan

(57) ABSTRACT

A composition for flooring containing coconut fibers according to the present invention comprises: (A) 100 parts by weight of acrylonitrile-butadiene latex consisting of 20 to 60 parts by weight of acrylonitrile, 40 to 80 parts by weight of butadiene, 1 to 3 parts by weight of a first emulsifier, and 4 to 7 parts by weight of an acrylic monomer; (B) 3 to 6 parts by weight of a vulcanizing agent obtained by mixing sulfur, EZ, MZ, and a second emulsifier in a ratio of 3:1:1:0.1; (C) 2 to 3 parts by weight of a zinc oxide; (D) 2 to 5 parts by weight of an antioxidant; and (E) 20 to 40 parts by weight of calcium carbonate.

8 Claims, No Drawings

COMPOSITION FOR FLOORING CONTAINING COCONUT FIBERS AND METHOD FOR MANUFACTURING FLOORING USING SAME

TECHNICAL FIELD

The present invention relates to a composition for flooring. More specifically, the present invention relates to a composition for flooring containing coconut fiber and a method of manufacturing flooring using the composition. According to the present invention, flooring manufactured using the composition may have excellent tensile strength, durability, and weather resistance. In addition, heavy metals or harmful substances are not released from the flooring containing coconut fiber manufactured using the composition. Therefore, the composition of the present invention may be used to manufacture environmentally friendly flooring.

BACKGROUND ART

In general, flooring is installed on children's playgrounds, stadium tracks, and roads for jogging and cycling to provide shock absorption and cushioning. By installing such flooring, for example, it is possible to reduce fatigue or prevent injury during exercise. In manufacture of such flooring, PVC, waste tires, rubber, and the like are ground into chips, an adhesive and a curing agent are added thereto in a certain ratio, mixing and stirring are carried out, and the resulting mixture is subjected to compression molding.

Since flooring manufactured by conventional methods has limitations in elasticity and restoring force, strength and durability thereof are significantly lowered after use for many years. Accordingly, techniques for using various additives or modifying the structure of flooring material have been proposed.

To solve these problems, for example, a method of enhancing the performance of a urethane binder is disclosed in Korean Patent Application Publication No. 10-2012-0027763. In addition, a method of performing elastic packaging using a composite material composed of waste tire chips, recycled rubber chips, and the like on the surfaces of a polyurethane resin and ethylene propylene diene monomer (EPDM) chips is disclosed in Korean Patent Application Publication No. 10-2013-0128222.

As in the prior art, the elastic packing material manufactured using the composite material may impart sufficient elasticity to the floor, thereby improving the walking feeling of pedestrians and mitigating impact, thereby preventing occurrence of accidents. However, in view of recycling of resources, the conventional elastic packaging materials are manufactured using recycled materials such as waste tire chips or recycled rubber chips, or EPDM chips. In this case, harmful substances such as volatile organic compounds (VOCs) may be released from the conventional elastic packaging materials. Particularly, at high temperatures, the emission amount of the harmful substances may be increased. Furthermore, conventional elastic flooring formed by adhering composite materials having different properties, such as a polyurethane resin, EPDM chips, waste tire chips, and recycled rubber chips, has low adhesiveness. Therefore, when the conventional flooring is installed on the floor, the flooring may be easily broken by external impact.

To solve the above-mentioned problems, the present invention discloses a composition for elastic flooring containing environmentally friendly coconut fiber without waste rubber or waste tires and flooring manufactured using the composition.

DISCLOSURE

Technical Problem

Therefore, the present invention has been made in view of the above problems, and it is one object of the present invention to provide a composition for flooring containing environmentally friendly coconut fiber free from emission of harmful substances and flooring manufactured using the composition.

It is another object of the present invention to provide a composition for flooring having excellent tensile strength, durability, and weather resistance and flooring manufactured using the composition.

The above objects and other intrinsic objects of the present invention may be easily achieved by the present invention described below.

Technical Solution

In accordance with one aspect of the present invention, provided is a composition for flooring containing coconut fiber including:

(A) 100 parts by weight of acrylonitrile-butadiene latex composed of 20 to 60 parts by weight of acrylonitrile, 40 to 80 parts by weight of butadiene, 1 to 3 parts by weight of a first emulsifier, and 4 to 7 parts by weight of acrylic monomers;

(B) 3 to 6 parts by weight of a vulcanizing agent prepared by mixing sulfur, EZ, MZ, and a second emulsifier in a ratio of 3:1:1:0.1;

(C) 2 to 3 parts by weight of zinc oxide;

(D) 2 to 5 parts by weight of an antioxidant; and (E) 20 to 40 parts by weight of calcium carbonate.

According to the present invention, the composition may selectively include (F) less than 5 parts by weight of rhodinic acid.

According to the present invention, the first emulsifier may include one or more emulsifiers selected from the group being composed of monoethanolamine (MEA), diethanolamine (DEA), triethanolamine (TEA), diglycolamine (DGA), dichlorohexylamine (DCHA), oleic acid amine salt, tall oil amine salt, succinic acid amine salt, fatty acid, polyoxyethylene glycol fatty acid-ester, polyoxyethylene tridecyl ether, sorbitan oleate, and sodium sulfonate.

According to the present invention, the second emulsifier may be a mixture of one or more selected from the group being composed of methanol, ethanol, propanol, and dimethylpolysiloxane.

In accordance with another aspect of the present invention, provided is a method of manufacturing flooring containing coconut fiber including:

a step of applying the composition for flooring according to the present invention to coconut fiber; and a step of compressing the coconut fiber applied with the composition.

Advantageous Effects

As apparent from the foregoing, the present invention advantageously provides a composition for flooring having environmentally friendly characteristics without emission of harmful substances and having excellent physical properties such as durability, elastic restoring force, abrasion resistance, and weather resistance.

BEST MODE

A composition for flooring containing coconut fiber includes:

(A) 100 parts by weight of acrylonitrile-butadiene latex composed of 20 to 60 parts by weight of acrylonitrile, 40 to 80 parts by weight of butadiene, 1 to 3 parts by weight of a first emulsifier, and 4 to 7 parts by weight of acrylic monomers;

(B) 3 to 6 parts by weight of a vulcanizing agent prepared by mixing sulfur, EZ, MZ, and a second emulsifier in a ratio of 3:1:1:0.1;

(C) 2 to 3 parts by weight of zinc oxide;

(D) 2 to 5 parts by weight of an antioxidant; and (E) 20 to 40 parts by weight of calcium carbonate.

According to the present invention, the physical properties of coconut fiber may be improved by applying a solution prepared by mixing the composition for flooring of the present invention and water in a ratio of 50:50 or 45:55 to the surface of the coconut fiber. The coconut fiber having improved physical properties may be used to manufacture flooring.

According to the present invention, the acrylonitrile-butadiene latex (A) is solid rubber latex and imparts elastic force to coconut fiber and serves as a matrix for modifying the surface of the coconut fiber. The latex used herein is water-soluble, and does not require use of an organic compound such as a conventional polyurethane binder, and has good weather resistance and is suitable for flooring. In the composition for flooring according to the present invention, other components are mixed and used based on 100 parts by weight of the acrylonitrile-butadiene latex (A).

According to the present invention, the first emulsifier may include one or more emulsifiers selected from the group being consisted of monoethanolamine (MEA), diethanolamine (DEA), triethanolamine (TEA), diglycolamine (DGA), dichlorohexylamine (DCHA), oleic acid amine salt, tall oil amine salt, succinic acid amine salt, fatty acid, polyoxyethylene glycol fatty acid-ester, polyoxyethylene tridecyl ether, sorbitan oleate, and sodium sulfonate.

According to the present invention, as the acrylic monomers, monomers obtained from methyl(meth)acrylate, ethyl (meth)acrylate, propyl(meth)acrylate, isopropyl(meth)acrylate, butyl(meth)acrylate, isobutyl(meth)acrylate, pentyl (meth)acrylate, hexyl(meth)acrylate, heptyl(meth)acrylate, octyl(meth)acrylate, isooctyl(meth)acrylate, 2-ethylhexyl (meth)acrylate, nonyl(meth)acrylate, isononyl(meth)acrylate, decyl(meth)acrylate, undecyl(meth)acrylate, dodecyl (meth)acrylate, tridecyl(meth)acrylate, tetradecyl(meth) acrylate, cyclopentyl(meth)acrylate, cyclohexyl(meth) acrylate, and the like may be used.

According to the present invention, the acrylonitrile-butadiene latex (A) is prepared by mixing 20 to 60 parts by weight of acrylonitrile, 40 to 80 parts by weight of butadiene, 1 to 3 parts by weight of a first emulsifier, and 4 to 7 parts by weight of acrylic monomers. Then, based on 100 parts by weight of the prepared latex, other components are added in the proportions described below.

According to the present invention, the vulcanizing agent (B) is an organic vulcanization accelerator, and serves to shorten vulcanization time by increasing vulcanization rate and to improve quality while lowering vulcanization temperature. The organic vulcanization accelerator used in the present invention is used in combination with Zn—MBT (MZ) containing thiazole-based 2-mercapto benzo thiazole (MBT) and dithiocarbamate-based zinc dimethyl dithiocarbamate (ZnEDC) (EZ), and a second emulsifier is added at the same time.

According to the present invention, as the second emulsifier to be applied to the vulcanizing agent (B), one or more selected from lipophilic surfactants, hydrophilic emulsion stabilizers, and lipophilic emulsion stabilizers may be used. In addition, as the second emulsifier, one or more selected from the group being composed of alcohols (methanol, ethanol, propanol, and the like) and dimethylpolysiloxane may be mixed and used.

According to the present invention, the vulcanizing agent (B) includes sulfur, EZ, MZ, and the second emulsifier in a ratio of 3:1:1:0.1.

According to the present invention, the vulcanizing agent (B) is used in an amount of 3 to 6 parts by weight based on 100 parts by weight of the acrylonitrile-butadiene latex (A).

According to the present invention, the zinc oxide (C) acts as a vulcanization accelerator, and is used in the form of light-white powder. The zinc oxide (C) is an amphoteric oxide which is almost insoluble in water but soluble in dilute acid and strong alkali. According to the present invention, the zinc oxide (C) is used in an amount of 2 to 3 parts by weight based on 100 parts by weight of the acrylonitrile-butadiene latex (A).

According to the present invention, as the antioxidant (D), aromatic amines, hydroquinone, amino acids, or the like may be used. As a specific example, one or more selected from N-(1,3-dimethylbutyl)-N'-phenyl-p-phenylenediamine (6PPD); 2-mercaptobenzimidazole compounds; 2-benzimidazolethiol; dialkylated diphenylamine; octylated diphenylamine; nickel dibutyldithiocarbamate; N-isopropyl-N'-phenyl-p-phenylenediamine; 4'-diphenyl-isopropyl-dianiline; 2,2'-methylenebis(6-tert-butyl-methylphenol); and paraffin wax may be used as the antioxidant (D). According to the present invention, the antioxidant (D) is used in an amount of 2 to 5 parts by weight based on 100 parts by weight of the acrylonitrile-butadiene latex (A).

The calcium carbonate (E) is obtained by grinding limestone, pulverizing the ground limestone into powder, and sieving the powder or by an operation of dividing particles by size or specific gravity using the difference in speed when free sedimentation of solid particles occurs in air. In addition, the calcium carbonate (E) is also prepared by filtering, drying, and finely grinding precipitates formed by blowing carbon dioxide into limewater. According to the present invention, the calcium carbonate (E) is compounded as a reinforcing agent. The calcium carbonate (E) is used in an amount of 20 to 40 parts by weight based on 100 parts by weight of the acrylonitrile-butadiene latex (A).

According to the present invention, the rhodinic acid (F) may be selectively contained. The rhodinic acid (F) is a natural substance extracted from nature, and is used as an additive and food preservative in foods and the like. The molecular weight of rhodinic acid is 170.25, and the linear molecular formula thereof is $(CH_3)_2C=CHCH_2CH_2CH(CH_3)CH_2CO_2H$. In the present invention, rhodinic acid may further impart environmental friendliness to the composition for flooring. That is, rhodinic acid may reduce the amount of VOC emitted from flooring. According to the present invention, the rhodinic acid (F) is used in an amount of 0 to 5 parts by weight based on 100 parts by weight of the acrylonitrile-butadiene latex (A).

The composition for flooring including the above components is mixed with water and sprayed onto the surface of coconut fiber. In this case, 45 to 50 wt % of the composition for flooring and 50 to 55 wt % of water are mixed.

MODE FOR INVENTION

Examples 1 to 5

50 parts by weight of acrylonitrile, 40 parts by weight of butadiene, 3 parts by weight of monoethanolamine (MEA) purchased from JA Chem. Co., Ltd. as the first emulsifier, and 7 parts by weight of commercially available methyl (meth)acrylate monomers as the acrylic monomers were added to a reactor and copolymerized to prepare 100 parts by weight of the acrylonitrile-butadiene latex (A). Based on the acrylonitrile-butadiene latex (A), other components were mixed as shown in Table 1 below to prepare compositions for flooring according to Examples 1 to 5. The rhodinic acid (F) was used only in Example 5, and rhodinic acid solids (Sigma-Aldrich, product number 364428) and other components were added at the same time.

TABLE 1

| Components | Examples | | | | |
|---|---|---|---|---|---|
| | 1 | 2 | 3 | 4 | 5 |
| (A) | | | 100 | | |
| (B) | 3 | 3 | 4 | 4 | 5 |
| (C) | 3 | 3 | 3 | 2 | 2 |
| (D) | 4 | 4 | 5 | 5 | 2 |
| (E) | 30 | 25 | 35 | 30 | 20 |
| (F) | — | — | — | — | 5 |

Coconut fiber to which the compositions for flooring prepared in Examples 1 to 5 were applied was prepared. The prepared coconut fiber was discharged into a nozzle one by one while stranding the two strands together to form a roll. The roll was put into a dryer and heat-treated at 120 to 200° C. for 30 minutes. The heat-treated coconut fiber roll was cut at regular intervals and fed into a barrel rotating in the opposite direction to the weaving direction. High pressure air was injected into the rotating barrel to decompose the cut fiber. The decomposed coconut fiber was carried on a conveyor belt. At this time, a solution prepared by mixing the compositions for flooring prepared in Examples 1 to 5 and water in a ratio of 1:1 was sprayed onto the surface of the coconut fiber on the conveyor belt through a spray nozzle installed above the conveyor belt. In this manner, the compositions for flooring according to Examples 1 to 5 diluted with water were applied to the surface of the coconut fiber.

The prepared coconut fiber was put between two pressure rolls to prepare five sheet-shaped coconut mats having a certain size. For various tests, five specimens having a width of 100 mm, a length of 200 mm, and a thickness of 10 mm were prepared using the prepared mats.

The following evaluation items for measuring the various properties of the prepared specimens were submitted to the Korea Conformity Laboratories, and the obtained results are shown below.

(1) Tensile strength (length): KS K 0743:2009 C.R.E, (Unit: N) [(20.0±2.0)° C., (50±10) % R.H.]
(2) Tensile elongation (length): KS K 0743:2009 C.R.E, (Unit: %) [(20.0±2.0)° C., (50±10) % R.H.]
(3) Slip resistance (wet): KS F 2375:2001 (Unit: BPN)
(4) Release of harmful substances: The Ministry of Public Safety and Security Notification No. 2015-143 (Dec. 24, 2015) (Unit: mg/kg)
(5) Accelerated exposure testing: GR M 6004:2008 (color change test after exposure to a xenon lamp for 250 hours (Grey Scale)), (Unit: grade) [(25.0±2.0)° C., (50±10) % R.H.]
(6) Dimensional change rate: KS I 3403:2014 (Unit: %) (70.0±1)° C., 48 h
(7) Limit descent height: Safety Certification Criteria Annex 2 (Children's Playground) [The Ministry of Trade, Industry and Energy Notification No. 2015-0107 (Jun. 4, 2015)]

The properties of the compositions of Examples 1 to 5 were evaluated according to the above test items, and the results are shown in Tables 2 and 3.

TABLE 2

| Test items | Examples | | | | |
|---|---|---|---|---|---|
| | 1 | 2 | 3 | 4 | 5 |
| Tensile strength (length) | 1,244.6 | 1,235.5 | 1,247.5 | 1,245.4 | 1,220.4 |
| Tensile elongation (length) | 46.0 | 45.9 | 45.5 | 46.2 | 44.9 |
| Slip resistance | 65 | 64 | 65 | 65 | 62 |
| Accelerated exposure testing | 4 | 5 | 4 | 4 | 5 |
| Dimensional change rate | −1.7 | −1.6 | −1.5 | −1.6 | −1.2 |
| Limit descent height | 1,355 | 1,353 | 1,356 | 1,354 | 1,325 |

TABLE 3

| Test items | Examples |
|---|---|
| | 1    2    3    4    5 |
| Elution of harmful elements/lead (Pb) | Non-detection (detection limit 5) |
| Elution of harmful elements/cadmium (Cd) | Non-detection (detection limit 5) |
| Elution of harmful elements/barium (Ba) | Non-detection (detection limit 5) |
| Elution of harmful elements/selenium (Se) | Non-detection (detection limit 5) |
| Elution of harmful elements/chromium (Cr) | Non-detection (detection limit 2) |
| Elution of harmful elements/antimony (Sb) | Non-detection (detection limit 5) |
| Elution of harmful elements/arsenic (As) | Non-detection (detection limit 2) |
| Elution of harmful elements/mercury (Hg) | Non-detection (detection limit 2) |
| Formaldehyde | Non-detection (detection limit 20) |
| T-VOCs (Benzene) | Non-detection (detection limit 0.2) |
| T-VOCs (Ethylbenzene) | Non-detection (detection limit 1) |
| T-VOCS (Xylene) | Non-detection (detection limit 1) |
| Benzo(a)anthracene | Non-detection (detection limit 0.2) |
| Chrysene | Non-detection (detection limit 0.2) |
| Benzo(b)fluoranthene | Non-detection (detection limit 0.2) |
| Benzo(k)fluoranthene | Non-detection (detection limit 0.2) |
| Benzo(e)pyrene | Non-detection (detection limit 0.2) |
| Benzo(a)pyrene | Non-detection (detection limit 0.2) |
| Dibenzo(a, h)anthracene | Non-detection (detection limit 0.2) |

As shown in Tables 1 and 2, flooring prepared by applying the composition for flooring according to the present invention to coconut fiber satisfies environmental requirements and the required physical properties. Therefore, the flooring may be suitable for the floor of a children's playground, the track of a playground, and the like, and may be replaced with a rubber or urethane mat used for civil engineering or construction work.

Embodiments of the present invention disclosed, in the present specification are only provided to aid in understanding of the present invention and the present invention is not limited to the embodiments. The scope of the present invention is defined by the appended claims, and all modifications and changes within the claims are intended to be within the scope of the present invention.

The invention claimed is:

1. A composition for flooring, including:
    (A) 100 parts by weight of acrylonitrile-butadiene latex composed of 20 to 60 parts by weight of acrylonitrile, 40 to 80 parts by weight of butadiene, 1 to 3 parts by weight of a first emulsifier, and 4 to 7 parts by weight of acrylic monomers;
    (B) 3 to 6 parts by weight of a vulcanizing agent prepared by mixing sulfur, EZ, MZ, and a second emulsifier in a ratio of 3:1:1:0.1;
    (C) 2 to 3 parts by weight of zinc oxide;
    (D) 2 to 5 parts by weight of an antioxidant; and
    (E) 20 to 40 parts by weight of calcium carbonate.

2. The composition according to claim 1, further including:
    (F) less than 5 parts by weight of rhodinic acid.

3. The composition according to claim 1, wherein the first emulsifier includes one or more emulsifiers selected from the group consisting of:
    monoethanolamine (MEA),
    diethanolamine (DEA),
    triethanolamine (TEA),
    diglycolamine (DGA),
    dichlorohexylamine (DCHA),
    oleic acid amine salt,
    tall oil amine salt,
    succinic acid amine salt,
    fatty acid,
    polyoxyethylene glycol fatty acid-ester,
    polyoxyethylene tridecyl ether,
    sorbitan oleate, and
    sodium sulfonate.

4. The composition according to claim 2, wherein the first emulsifier includes one or more emulsifiers selected from the group consisting of:
    monoethanolamine (MEA),
    diethanolamine (DEA),
    triethanolamine (TEA),
    diglycolamine (DCA),
    dichlorohexylamine (DCHA),
    oleic acid amine salt,
    tall oil amine salt,
    succinic acid amine salt,
    fatty acid,
    polyoxyethylene glycol fatty acid-ester,
    polyoxyethylene tridecyl ether,
    sorbitan oleate, and
    sodium sulfonate.

5. The composition according to claim 1, wherein the second emulsifier is a mixture of one or more selected from the group consisting of:
    methanol,
    ethanol,
    propanol,
    and dimethylpolysiloxane.

6. The composition according to claim 2, wherein the second emulsifier is a mixture of one or more selected from the group consisting of:
    methanol,
    ethanol,
    propanol,
    and dimethylpolysiloxane.

7. A method of manufacturing flooring containing coconut fiber, comprising:
    applying the composition for flooring according to claim 1 to coconut fiber; and
    compressing the coconut fiber applied with the composition.

8. A method of manufacturing flooring containing coconut fiber, comprising:
    applying the composition for flooring according to claim 2 to coconut fiber; and
    compressing the coconut fiber applied with the composition.

* * * * *